United States Patent [19]

Drent et al.

[11] Patent Number: 4,820,802

[45] Date of Patent: Apr. 11, 1989

[54] IMPROVED PROCESS OF PREPARING CARBON MONOXIDE/OLEFIN COPOLYMER WITH ORTHO SUBSTITUTED PHOSPHINE CATALYST COMPOSITION.

[75] Inventors: Eit Drent; Richard L. Wife; Petrus W. N. M. Van Leeuwen, all of Amsterdam, Netherlands

[73] Assignee: Shell Oil Company, Houston, Tex.

[21] Appl. No.: 135,427

[22] Filed: Dec. 21, 1987

[30] Foreign Application Priority Data

Feb. 3, 1987 [NL] Netherlands .......................... 8700255

[51] Int. Cl.$^4$ .............................................. C08G 67/02
[52] U.S. Cl. .................... 528/392; 502/150; 502/162
[58] Field of Search ......................................... 528/392

[56] References Cited

U.S. PATENT DOCUMENTS

| | | | |
|---|---|---|---|
| 2,495,286 | 1/1950 | Brubaker | 260/63 |
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 4,474,978 | 10/1984 | Drent | 560/24 |
| 4,599,476 | 7/1986 | Drent | 585/511 |
| 4,634,793 | 1/1987 | Drent | 560/243 |

FOREIGN PATENT DOCUMENTS

| | | |
|---|---|---|
| 0121965 | 10/1984 | European Pat. Off. . |
| 0181014 | 5/1986 | European Pat. Off. . |
| 0213671 | 3/1987 | European Pat. Off. . |
| 0222454 | 5/1987 | European Pat. Off. . |
| 1081304 | 3/1965 | United Kingdom . |
| 2058074 | 8/1967 | United Kingdom . |

*Primary Examiner*—Harold D. Anderson

[57] ABSTRACT

Linear alternating polymers of carbon monoxide and at least one ethylenically unsaturated hydrocarbon are produced in the presence of a novel catalyst composition formed from a palladium compound, the anion of a non-hydrohalogenic acid having a pKa less about 4 and an orthosubstitued phenyl phosphine.

7 Claims, No Drawings

IMPROVED PROCESS OF PREPARING CARBON MONOXIDE/OLEFIN COPOLYMER WITH ORTHO SUBSTITUTED PHOSPHINE CATALYST COMPOSITION.

FIELD OF THE INVENTION

This invention relates to an improved process of producing linear alternating polymers of carbon monoxide and at least one ethylenically unsaturated hydrocarbon. More particularly, it relates to a process for the production of such polymers in the presence of a novel catalyst composition formed from a palladium compound, the anion of a non-hydrohalogenic acid having a pKa less than about 4 and an ortho-substituted triphenyl phosphine.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical catalysts, e.g., peroxy compounds. U.K. Pat. No. 1,081,304 produced similar polymers of higher carbon monoxide content in the presence of alkylphosphine complexes of palladium salts as catalyst. Nozaki extended the process through the use of triarylphosphine complexes of palladium salts and certain inert solvents, e.g., U.S. Pat. No. 3,694,412.

More recently, the class of linear alternating polymers of carbon monoxide and at least one ethylenically unsaturated hydrocarbon, also known as polyketones, has become of greater interest because of the greater availability of the polymers. The polymers have been shown to be of the formula $-CO-A-$ wherein A is the moiety of unsaturated hydrocarbon polymerized through the ethylenic unsaturation. For example, when the ethylenically unsaturated hydrocarbon is ethylene, the polymer is represented by the formula $-CO-(-CH_2-CH_2-)-$.

It is known that the nature of the phosphine or other complexing ligand employed has a considerable influence on the efficiency of the polymerization process. More recent polyketone polymerization processes employ a bidentate ligand of phosphorus, arsenic or antimony in combination with a palladium compound and the anion of a non-hydrohalogenic acid of a pKa less than about 6, preferably less than about 2. Such processes are illustrated by published European Patent Applications Nos. 0,121,965 and 0,181,014 and by copending U.S. patent application Ser. No. 930,468, filed Nov. 14, 1986 (Docket No. K-0722).

Within the earlier work of Nozaki with monodentate phosphines considerable differences in activity were found which could be attributed to the triarylphosphine ligand employed. In the catalyst complexes of U.S. Pat. No. 3,694,412, as shown in Table 1, column 4, good results are obtained with triphenylphosphine-based catalysts and also when the phenyl groups were substituted in the para or the meta positions. However, use of an ortho-substituted phenyl phosphine did not produce measurable amounts of polymer and the use of the ortho-substituted triphenyl phosphines was discouraged.

Although quite satisfactory yields of polyketones are produced with use of the bidentate phosphorus ligands employed in conjunction with a palladium compound and the anion of a strong non-hydrohalogenic acid, it would be of advantage to have available a more simple catalyst composition.

SUMMARY OF THE INVENTION

It has now been found that a novel catalyst composition formed from a palladium compound, the anion of a non-hydrohalogenic acid of pKa less than about 4 and an ortho-substituted triphenylphosphine is an effective catalyst for the polymerization to linear alternating polymers of carbon monoxide and at least one ethylenically unsaturated hydrocarbon.

DESCRIPTION OF THE INVENTION

The novel catalyst of the invention is formed from a palladium compound, the anion of a non-hydrohalogenic acid of pKa less than about 4, preferably less than about 2, and a triphenylphosphine wherein at least one phenyl is substituted in the ortho position relative to the phosphorus.

The palladium compound is the palladium salt of an organic acid of up to 10 carbon atoms, preferably the salt of a monocarboxylic acid. Preferred as palladium compound catalyst composition precursors are the palladium alkanoates such as palladium acetate, palladium propionate, palladium isobutyrate, palladium hexanoate and palladium decanoate. Particularly preferred as the palladium compound is palladium acetate.

The anion to be employed in the formation of the catalyst composition is the anion of a non-hydrohalogenic acid of a pKa less than about 4 (determined in aqueous solution at 18° C.). Illustrative acids include inorganic acids such as perchloric acid, sulfuric acid, phosphoric acid and nitric acid as well as organic acids including the sulfonic acids 2-hydroxypropane-2-sulfonic acid, p-toluenesulfonic acid, methanesulfonic acid and trifluoromethanesulfonic acid and the carboxylic acids such as dichloroacetic acid, difluoroacetic acid, trichloroacetic acid, trifluoroacetic acid, tartaric acid and 2,5-dihydroxybenzoic acid. Preferred anions are anions of non-hydrohalogenic acids having a pKa less than about 2 and particularly preferred are the anions of p-toluenesulfonic acid and trifluoroacetic acid.

Quantities of anion to be utilized are from about 0.5 equivalent to about 200 equivalents of anion per gram atom of palladium (as the compound) and in particular from about 1 equivalent to about 100 equivalents per gram atom of palladium. The anion is most often provided in the form of the free acid but in an alternate modification the anion is provided as a metal salt. When metal salts are utilized, salts of transition metals other than the noble metals give best results, particularly salts of copper. In yet another modification the anion is provided as a single compound with the palladium, for example as the palladium compound palladium p-toluenesulfonate.

The phosphine ligands of the invention can be depicted as triphenylphosphines in which at least one but preferably each of the phenyl substituents of the phosphorus is substituted in an ortho position relative to the phosphorus. The phenyl groups are optionally substituted in other ring positions but at least one, and preferably all three, of the phenyl groups have an ortho substituent. Ortho substituents are hydrocarbyl including alkyl and such that the ortho substituent is bridged to a second phenyl ring carbon atom with a hydrocarbon bridge, or are non-hydrocarbyl including halo particularly middle halo, e.g., chloro and bromo, cyano, hydroxy, alkoxy, particularly lower alkoxy of up to 4 carbon atoms including methoxy and ethoxy, and carbalkoxy of up to 6 carbon atoms including carbomethoxy and carbethoxy. The preferred ortho-substituted phenyl phosphines are represented by the formula

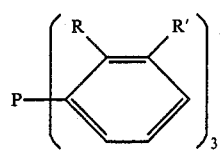

wherein R is the ortho substituent and R' is hydrogen or such that when taken with R form a hydrocarbon bridge of from 2 to 4 carbon atoms inclusive.

Illustrative ortho substituted phosphines include diphenyl-o-tolylphosphine, phenyl-di(o-tolyl)phosphine, tri(o-tolyl)phosphine, phenyl-(2-chlorophenyl)-(2-ethylphenyl)phosphine, tri-(2-hydroxyphenyl)phosphine, phenyldi(2-cyanophenyl)phosphine, tri(2-methoxyphenyl)phosphine and tri-(1-naphthyl)phosphine. A preferred class of ortho-substituted phosphines comprises tri(o-tolyl)phosphine, tri(2-methoxyphenyl)phosphine and tri(1-naphthyl)phosphine.

In the catalyst compositions of the invention, the phosphine is employed in a quantity of from about 0.1 mol to about 100 mol per gram atom of palladium, preferably in a quantity of from about 0.5 mol to about 50 mol per gram atom of palladium.

It is useful on occasion, but is not required, to employ a catalyst modifier to increase the catalyst activity. Preferred catalyst modifiers to be optionally employed for this purpose are quinones of up to 15 carbon atoms including the benzoquinones, the naphthaquinones and anthraquinones. Benzoquinones are the preferred catalyst modifier when modifier is employed, particularly 1,4-benzoquinone. No quinone modifier is required, but when present amounts of quinone up to 10,000 mol per gram atom of palladium are satisfactory with amounts from about 10 mol to about 5000 mol being preferred.

The polymers produced according to the process of the invention are the linear alternating polymers of carbon monoxide and at least one ethylenically unsaturated hydrocarbon often referred to as polyketones. Suitable ethylenically unsaturated hydrocarbons for use as precursors of the polyketones have from 2 to 20 carbon atoms inclusive, preferably up to 10 carbon atoms inclusive, and are aliphatic, such as ethylene and other α-olefins including propylene, 1-butene, 1-octene and 1-decene, or are aryl aliphatic containing an aryl substituent on an otherwise aliphatic molecule, particularly an aryl substituent on a carbon of the ethylenic unsaturation. Illustrative of this latter class of ethylenically unsaturated hydrocarbons are styrene, m-methylstyrene, p-methylstyrene and p-ethylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polymer is that of a linear alternating copolymer of carbon monoxide and ethylenically unsaturated hydrocarbon and will contain substantially 1 molecule of carbon monoxide for each molecule of hydrocarbon. When terpolymers of carbon monoxide, ethylene and a second hydrocarbon are produced there will be at least 2 units incorporating a moiety of ethylene per unit incorporating a moiety of the second hydrocarbon, preferably from about 10 units to about 100 units incorporating a moiety of ethylene per unit incorporating a moiety of the second hydrocarbon. The polymer chain is therefore illustrated by the formula

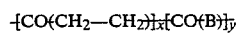

$-[CO-(CH_2-CH_2)]_x-[CO-(B)]_y-$ wherein B is the moiety obtained by polymerization of the second hydrocarbon through the ethylenic unsaturation. The $-CO-(CH_2-CH_2)-$ units and the $-CO-B-$ units are formed randomly throughout the polymer chain and the ratio of y:x is no more than about 0.5. In the modification of the invention which produces copolymers of carbon monoxide and ethylene, the polymer product will be represented by the above formula wherein $y=0$. When y is other than 0, i.e., terpolymers are produced, ratios of y:x from about 0.01 to about 0.1 are preferred. The end groups or "caps" of the polymer chain will depend upon what materials are present during the production of polymer and whether and how the polymer has been purified. The precise nature of the end groups is of little significance so far as the overall properties of the polymer are concerned so that the polymer is fairly represented by the polymer chain as depicted above.

Of particular interest are the polymers of molecular weight from about 1,000 to about 200,000, particularly those of molecular weight from about 10,000 to about 50,000. The physical properties of such polymers depend in part on the molecular weight of the polymer, whether the polymer is a copolymer or a terpolymer and the relative proportion of the second hydrocarbon present in the case of a terpolymer. Typical melting points of such polymers are from about 175° C. to about 280° C. and more frequently from about 210° C. to about 270° C.

The polymers are produced by contacting the reactants and catalyst composition components in an autoclave or similar reaction vessel where conditions of elevated temperature and pressure may be maintained. The mechanical nature of the reactor is not critical although best results are obtained when reactant-catalyst contact is maintained as by shaking or stirring. The amount of catalyst will be a catalytic quantity. Amounts of catalyst which are employed are sufficient to provide from about $1 \times 10^{-7}$ gram atom to about $1 \times 10^{-3}$ gram atom of palladium per mol of ethylenically unsaturated hydrocarbon to be polymerized but more typically provide from about $1 \times 10^{-6}$ gram atom to about $1 \times 10^{-4}$ gram atom of palladium per mol of ethylenically unsaturated hydrocarbon. The molar ratio of ethylenically unsaturated hydrocarbon to carbon monoxide to be utilized in the reaction mixture will be from about 10:1 to about 1:5 but preferably will be from about 5:1 to about 1:2.

Polymerization is conducted under polymerization conditions in the gaseous phase or in a liquid phase in the presence of an inert diluent such as a lower alkanol, e.g., methanol or ethanol. Suitable reaction temperatures are from about 20° C. to about 200° C. with preferred reaction temperatures being from about 30° C. to about 150° C. Typical reaction pressures are from about 1 bar to about 200 bar, more typically from about 20 bar to about 100 bar. Subsequent to reaction, the polymer product is recovered by conventional means such as decantation or filtration. The polymer product may contain residues of the catalyst which are removed, if desired, by treatment with a solvent selective for the residues.

The polyketone polymers are in general premium thermoplastics of established utility. Applications of the polyketone include the production of containers for food and drink and by thermoforming a polyketone sheet, the production of shaped parts for the automotive industry as by injection molding and the production of wire and cable as by processes of extrusion.

The invention is further illustrated by the following Illustrative Embodiments and Comparative Example (not of the invention) which should not be construed as limiting. The carbon monoxide/ethylene copolymers produced had a melting point of 257° C. and were shown by $^{13}$C—NMR to be of a linear alternating structure consisting of units of the formula —CO—(CH$_2$—CH$_2$)—.

COMPARATIVE EXAMPLE

A copolymer of carbon monoxide and ethylene was produced by the following procedure. A mechanically stirred autoclave of 250 ml capacity was charged with a catalyst solution consisting of 50 ml of methanol, 0.1 mmol of palladium acetate, 2.0 mmol of p-toluenesulfonic acid and 0.3 mmol of triphenylphosphine. After the air present in the autoclave was removed by evacuation, ethylene was introduced until a pressure of 30 bar was reached and carbon monoxide was added until a pressure of 60 bar was reached. The contents of the autoclave were heated to 110° C. and maintained for 5 hours at that temperature. Polymerization was then terminated by cooling to room temperature and releasing the pressure. The polymer product was removed by filtration, washed with methanol and dried in vacuo at room temperature.

Based on the weight of polymer formed, the polymerization rate was calculated to be 5 g of copolymer/g palladium/hr.

ILLUSTRATIVE EMBODIMENT I

A carbon monoxide/ethylene copolymer was produced substantially by the procedure of the Comparative Example except that (a) the catalyst solution contained 1.0 mmol instead of 2.0 mmol of p-toluenesulfonic acid and 0.15 mmol of tri(o-tolyl)phosphine instead of 0.3 mmol of triphenylphosphine, and (b) the reaction temperature was 80° C. instead of 110° C. The calculated polymerization rate was 20 g of copolymer/g palladium/hr.

ILLUSTRATIVE EMBODIMENT II

A carbon monoxide/ethylene copolymer was produced by substantially the same procedure as the Comparative Example except that (a) the catalyst solution contained 1.0 mmol for p-toluenesulfonic acid instead of 2.0 mmol and 0.3 mmol of tri(2-methoxyphenyl)phosphine instead of 0.3 mmol of triphenylphosphine, and (b) the reaction temperature was 105° C. instead of 110° C.

The calculated polymerization rate was 20 g of copolymer/g palladium/hr.

ILLUSTRATIVE EMBODIMENT III

A carbon monoxide/ethylene copolymer was produced by substantially the procedure of the Comparative Example except that the catalyst solution contained 1.0 mmol of p-toluenesulfonic acid instead of 2.0 mmol, and 0.15 mmol of tri(1-naphthyl)phosphine instead of 0.3 mmol of triphenylphosphine.

The calculated rate of polymerization was 120 g of copolymer/g palladium/hr.

ILLUSTRATIVE EMBODIMENT VI

When the procedure of Illustrative Embodiment I is repeated in the additional presence of propylene, a good yield of terpolymer of carbon monoxide, ethylene and propylene will be obtained at a satisfactory polymerization rate.

What is claimed is:

1. In the process of producing a linear alternating polymer of carbon monoxide and at least one ethylenically unsaturated hydrocarbon in the presence of a catalyst composition formed from a palladium compound and a phosphine ligand, the improvement which comprises employing in the catalyst composition the anion of a non-hydrohalogenic acid having a pKa less than about 4 and an ortho-substituted triphenylphosphine.

2. The process of claim 1 wherein the ortho-substituted triphenylphosphine is represented by the formula

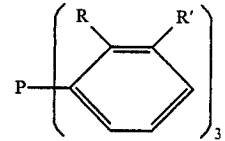

wherein R is alkyl, halo, cyano, hydroxy, alkoxy or carbalkoxy and R' is hydrogen or taken together with R form a hydrocarbon bridge of from 2 to 4 carbons inclusive.

3. The process of claim 2 wherein the anion is the anion of trifluoroacetic acid or p-toluenesulfonic acid.

4. The process of claim 2 wherein the phosphine is tri(o-tolyl)phosphine.

5. The process of claim 2 wherein the phosphine is tri(2-methoxyphenyl)phosphine.

6. The process of claim 2 wherein the phosphine is tri(1-naphthyl)phosphine.

7. The process of claim 6 wherein the anion is the anion of p-toluenesulfonic acid.

* * * * *